United States Patent
Jo et al.

(10) Patent No.: US 12,296,504 B2
(45) Date of Patent: May 13, 2025

(54) PYROLYSIS METHOD OF WASTE PLASTICS USING BATCH REACTOR

(71) Applicants: SK Innovation Co., Ltd., Seoul (KR); SK Geo Centric Co., Ltd., Seoul (KR)

(72) Inventors: Sanghwan Jo, Daejeon (KR); Sookil Kang, Daejeon (KR); Jaeheum Jung, Daejeon (KR); Howon Lee, Daejeon (KR)

(73) Assignees: SK Innovation Co., Ltd., Seoul (KR); SK Geo Centric Co., Ltd., Seoul (KR)

( * ) Notice: Subject to any disclaimer, the term of this patent is extended or adjusted under 35 U.S.C. 154(b) by 0 days.

(21) Appl. No.: 18/660,732

(22) Filed: May 10, 2024

(65) Prior Publication Data

US 2024/0359368 A1    Oct. 31, 2024

Related U.S. Application Data

(63) Continuation of application No. 18/040,844, filed as application No. PCT/KR2022/016526 on Oct. 27, 2022.

(30) Foreign Application Priority Data

Oct. 27, 2021 (KR) .................. 10-2021-0144394

(51) Int. Cl.
*B29B 17/04* (2006.01)
*B29K 105/26* (2006.01)

(52) U.S. Cl.
CPC ...... *B29B 17/04* (2013.01); *B29B 2017/0496* (2013.01); *B29K 2105/26* (2013.01)

(58) Field of Classification Search
USPC .......................................... 521/40
See application file for complete search history.

(56) References Cited

U.S. PATENT DOCUMENTS

| | | | |
|---|---|---|---|
| 6,172,271 B1 | 1/2001 | Horizoe et al. | |
| 2006/0076224 A1 | 4/2006 | Ku | |

FOREIGN PATENT DOCUMENTS

| | | | |
|---|---|---|---|
| JP | 2004300186 A | | 10/2004 |
| JP | 200671995 A | | 3/2006 |
| JP | 4485621 B2 | | 6/2010 |
| JP | 2019123771 A | | 7/2019 |
| KR | 1020000064788 A | | 11/2000 |
| KR | 20130082131 A | * | 7/2013 |
| KR | 1020130082131 A | | 7/2013 |
| KR | 101307395 B1 | | 9/2013 |
| KR | 101916404 B1 | | 11/2018 |

OTHER PUBLICATIONS

KR-20130082131-A Machine Translation (Year: 2013).*

* cited by examiner

*Primary Examiner* — Terressa Boykin
(74) *Attorney, Agent, or Firm* — The Webb Law Firm (57) ABSTRACT

Provided is a pyrolysis method of waste plastics including the steps of inputting waste plastics to a batch reactor and performing heating to produce a waste plastic melt at a first temperature; heating the waste plastic melt to remove chlorine from the melt at a second temperature; and heating the waste plastic melt from which chlorine has been removed to produce a pyrolysate at a third temperature. The batch reactor is sequentially heated in a direction from a raw material inlet to a reaction product outlet so that the temperature is raised from the first temperature to the third temperature.

8 Claims, 5 Drawing Sheets

PYROLYSIS METHOD OF WASTE PLASTICS USING BATCH REACTOR

CROSS REFERENCE TO RELATED APPLICATIONS

This application is a continuation of U.S. patent application Ser. No. 18/040,844 filed Oct. 27, 2022 which is the United States national phase of International Patent Application No. PCT/KR2022/016526 filed Oct. 27, 2022, and claims priority to Korean Patent Application No. 10-2021-0144394 filed Oct. 27, 2021, the disclosures of which are hereby incorporated by reference in their entireties.

BACKGROUND

Technical Field

The present invention relates to a pyrolysis method of waste plastics using a batch reactor.

Technical Considerations

Since a large amount of impurities resulting from a waste material are included in an oil (waste oil) produced by a cracking or pyrolysis reaction of the waste material such as a waste plastic pyrolysis oil, when the oil is used as a fuel, air pollutants such as $SO_x$ and NOx may be released, and in particular, a Cl component may be converted into HCl which may cause device corrosion in a high-temperature treatment process and be released.

Conventionally, Cl was removed by conversion into HCl by a hydrotreating (HDT) process using a refinery technique, but since the waste oil such as a waste plastic pyrolysis oil has a high Cl content, problems of equipment corrosion, reaction abnormality, and deterioration of product properties due to the production of an excessive amount of HCl formed in the HDT process have been reported, and it is difficult to practically introduce the waste oil which has not been pretreated to the HDT process. In order to remove a Cl oil by using a conventional refinery process, there is a need for a treatment technology of reducing Cl in a waste oil, which reduces the Cl content to a level to allow introduction to the refinery process.

Figure 2:
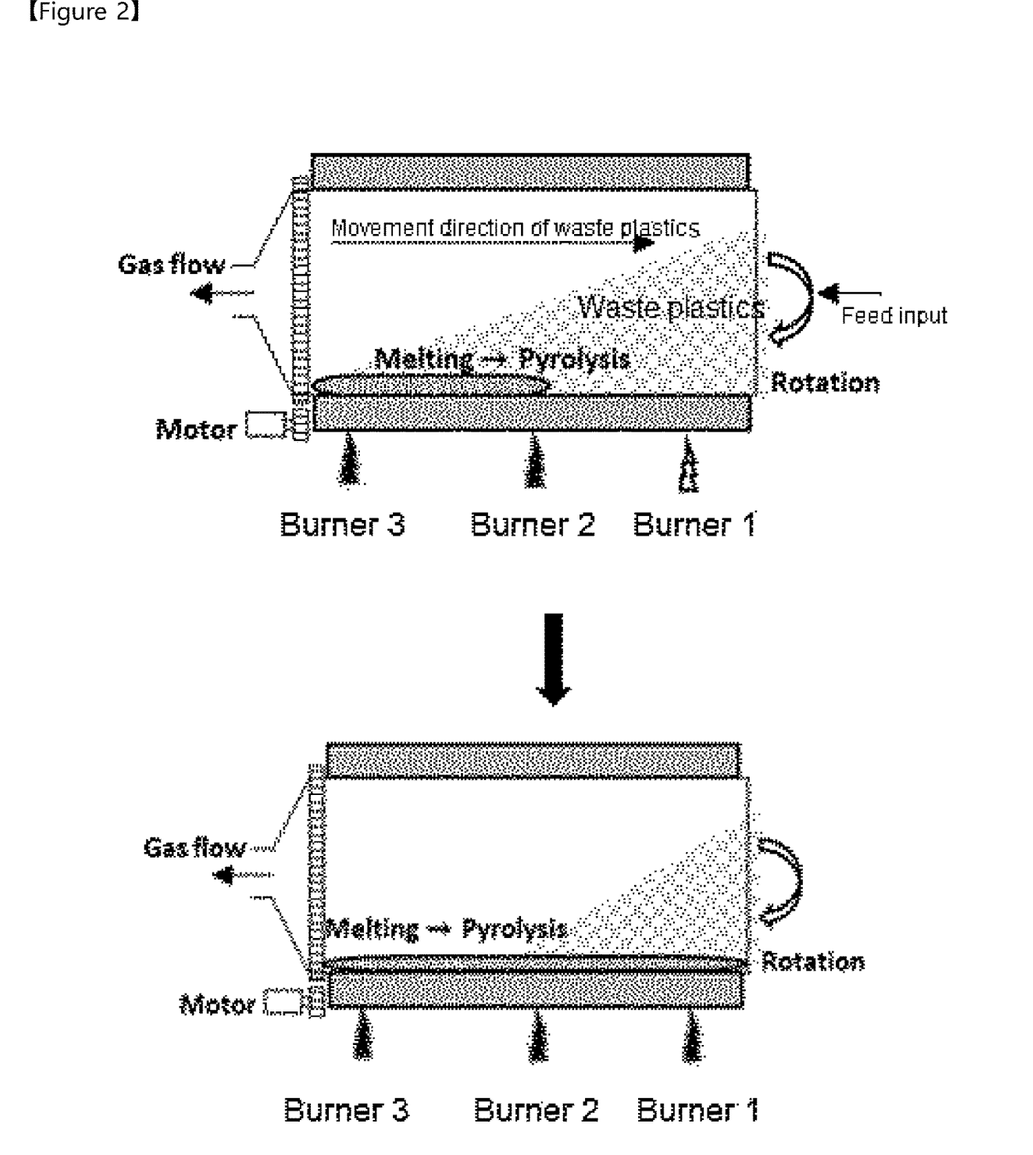
FIG. 2 is a schematic diagram showing a pyrolysis operation of a conventional technology.

In the conventional technology, when a waste plastic raw material is input to a batch reactor and heated, gas occurs with an increased reactor internal temperature, and the produced gas increases pressure inside the reactor. Due to the pressure increase, a problem of closing a gas outlet (reaction product outlet) by solid waste plastics with gas due to the increased pressure occurred. In order to improve the gas outlet blockage and suppress an internal pressure rise, an operation method in which a burner disposed at a reaction product outlet side is operated to perform heating sequentially in a direction from the reaction product outlet to the raw material inlet was applied. In the conventional operation method, a new problem in which waste plastics moved to a raw material inlet side of a reactor when a pyrolysis reactor temperature is raised and unmelted solid waste plastics were biased arose, and as a result, it was substantially impossible to melt waste plastics evenly (see FIG. 2). When the waste plastics are unevenly melted, a dechlorination reaction and a pyrolysis reaction are performed simultaneously, so that dissociated chlorine reacts with a pyrolysis oil to cause recombination of organic Cl to increase a chlorine content of a final product.

SUMMARY

Technical Problem

An object of the present invention is to solve safety issues such as impurity removal from waste plastic and reaction product outlet blockage of a reactor by applying a step-wise temperature rise control operation in which a dechlorination reaction and a pyrolysis reaction of waste plastics in a pyrolysis reactor are performed separately.

Another object of the present invention is to dissolve waste plastics in a reactor evenly throughout by applying a temperature control operation in each position of a reactor and improve a pressure fluctuation problem in a reactor.

Still another object of the present invention is to increase chlorine removal efficiency only by temperature control without inputting an additive/neutralizer, in a batch reactor (rotary kiln).

Technical Solution

In one general aspect, a pyrolysis method of waste plastics includes the steps of: a) inputting waste plastics to a batch reactor and performing heating to produce a waste plastic melt at a first temperature; b) heating the waste plastic melt to remove chlorine from the melt at a second temperature; and c) heating the waste plastic melt from which chlorine has been removed to produce a pyrolysate at a third temperature, wherein the batch reactor is sequentially heated in a direction from a raw material inlet to a reaction product outlet so that the temperature is raised from the first temperature to the third temperature.

In an exemplary embodiment of the present invention, the waste plastics may include at least one selected from the group consisting of polyethylene (PE), polypropylene (PP), polyethylene terephthalate (PET), polyvinyl chloride (PVC), and polystyrene (PS).

In an exemplary embodiment of the present invention, the waste plastics may include 7000 ppm or more of chlorine with respect to the total weight.

In an exemplary embodiment of the present invention, the process of step a) may be performed at 50 to 150° C. for 20 to 300 minutes under an anaerobic atmosphere.

In an exemplary embodiment of the present invention, the batch reactor may include a third area, a second area, and a first area sequentially in a direction from the raw material inlet to a reaction product outlet, and the process of step a) may include heating at least a portion of the third area, at least a portion of the second area, and/or at least a portion of the first area to raise the temperature to 50 to 150° C.

In an exemplary embodiment of the present invention, the batch reactor may include a third area, a second area, and a first area sequentially in a direction from the raw material inlet to a reaction product outlet, and the process of step a) may include a1) heating at least a portion of the third area to raise the temperature to 110 to 150° C.; a2) further heating at least a portion of the second area to raise the temperature to 110 to 150° C.; and a3) further heating at least a portion of the first area to raise the temperature to 110 to 150° C.

In an exemplary embodiment of the present invention, the process of step b) may be performed at 220 to 300° C. for 120 to 360 minutes under an anaerobic atmosphere.

In an exemplary embodiment of the present invention, a chlorine content in a gas product emitted in the process of step b) may be 1000 to 3500 ppm.

In an exemplary embodiment of the present invention, the process of step c) may be performed at 300 to 600° C. under an anaerobic atmosphere.

In an exemplary embodiment of the present invention, the pyrolysate of the process of step c) may include 50 to 800 ppm of total chlorine (Cl) and 10 to 500 ppm of organic chlorine with respect to the total weight.

Advantageous Effects

In the present invention, a uniform temperature gradient in a reactor is formed by an improved operation method as compared with a conventional batch reactor pyrolysate operation method, so that a dechlorination reaction and a pyrolysis reaction of waste plastics are effectively controlled to minimize recombination in which removed chlorine and produced olefin meet, thereby increasing chlorine removal efficiency. In addition, a specific temperature may be held for a desired period of time to implement a uniform waste plastic melting throughout the reactor, solve safety issues such as reaction product outlet blockage, and increase chlorine removal efficiency. In addition, reaction product outlet blockage may be improved to suppress a pressure fluctuation in a reactor.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION

Unless otherwise defined herein, all terms used in the specification (including technical and scientific terms) may have the meaning that is commonly understood by those skilled in the art. Throughout the present specification, unless explicitly described to the contrary, "comprising" any elements will be understood to imply further inclusion of other elements rather than the exclusion of any other elements. In addition, unless explicitly described to the contrary, a singular form includes a plural form herein.

In the present specification, "A to B" refers to "A or more and B or less", unless otherwise particularly defined.

In addition, "A and/or B" refers to at least one selected from the group consisting of A and B, unless otherwise particularly defined.

An embodiment of the present invention provides a pyrolysis method of waste plastics. The method includes the steps of: a) inputting waste plastics to a batch reactor and performing heating to produce a waste plastic melt at a first temperature; b) heating the waste plastic melt to remove chlorine from the melt at a second temperature; and c) heating the waste plastic melt from which chlorine has been removed to produce a pyrolysate at a third temperature, wherein the batch reactor is sequentially heated in a direction from a raw material inlet to a reaction product outlet so that the temperature is raised from the first temperature to the third temperature. The temperature may be higher in the order of the first temperature<the second temperature<the third temperature. In addition, as described later, the first temperature may be 50 to 150° C., the second temperature may be 220 to 330° C., and the third temperature may be 300 to 600° C., and the specific temperature will be described in relation to each process of steps a), b), and c).

Specifically, in the present invention, a step-wise temperature rise control operation of raising temperature in the inside of a reactor to the first temperature, the second temperature, and the third temperature is applied, thereby improving safety issues such as impurity removal from waste plastics and reaction product outlet blockage of a reactor. Specifically, in the present invention, waste plastics are dissolved evenly at the first temperature, chlorine is removed from a waste plastic melt at a second temperature, the waste plastics from which chlorine has been removed are pyrolyzed at the third temperature, thereby performing a) melting of waste plastics, b) chlorine removal, and c) pyrolysis as a separate step, respectively. In the conventional pyrolysis technology, the temperature is raised from room temperature to a pyrolysis end temperature without a control, thereby melting waste plastics in a reactor unevenly and simultaneously performing a chlorine removal step and an olefin production step (pyrolysis step), and in this case, chlorine dissociated from the waste plastics may be present in a pyrolysis oil in the form of organic chlorine by a resynthesis reaction of an olefin, and thus, it is difficult to show a chlorine removal effect in the conventional pyrolysis process. In addition, in the present invention, a batch reactor is sequentially heated in a direction from a raw material inlet to a reaction product outlet simultaneously with the step-wise temperature rise control, thereby forming a uniform temperature gradient in the reactor and performing an overall dissolution reaction of waste plastics to provide a free space in a reaction product outlet side of the pyrolysis reactor, and thus, a pressure rise and a safety problem by reactor neck blockage may be solved. In the conventional pyrolysis technology, in order to avoid a pressure rise due to the reactor neck blockage, a burner is operated from an area at a reaction product outlet side to raise the reactor temperature, but the waste plastics are unevenly dissolved.

The waste plastics may include at least one selected from the group consisting of polyethylene (PE), polypropylene (PP), polyethylene terephthalate (PET), polyvinyl chloride (PVC), and polystyrene (PS). The waste plastics may include organic chlorine (Cl) and inorganic chlorine (Cl). A large amount of impurities resulting from the waste plastics is included in the waste oil produced from the cracking and pyrolysis reactions of waste plastics such as waste plastic pyrolysis oil. In particular, the waste oil may be treated to remove a chlorine component such as organic/inorganic chlorine. The waste plastics are a household waste plastic waste, which is a mixed plastic of PVC, PS, PET, PBT, and the like in addition to PE and PP, and in the present invention, it means a mixed waste plastic waste including 3 wt % or more of PVC with PE and PP.

The waste plastics may include 7000 ppm of chlorine, specifically 7000 ppm or more and 13000 ppm or less of chlorine with respect to the total weight, but the present invention is not limited thereto. The chlorine component in the waste plastics has a problem in that it is discharged after being converted into HCl which may cause device corrosion in a treatment process at a high temperature.

The waste plastic melting process of step a) is for dissolving the solid waste plastics in the reactor evenly throughout, and is characterized by inputting waste plastics to a batch reactor and performing heating to produce a waste plastic melt at a first temperature.

The process of step a) may be performed at 50 to 150° C. for 20 to 300 minutes under an anaerobic atmosphere. Specifically, the anaerobic atmosphere may be a non-oxidizing atmosphere to which a vapor atmosphere or oxygen is not introduced, and the process of step a) may be performed at 70 to 130° C. or 90 to 110° C. for 30 to 280 minutes or 40 to 250 minutes. Thus, the waste plastics in the reactor may be dissolved evenly. In addition, since the non-oxidizing atmosphere may be created by moisture occurring in the dissolution of waste plastics, a separate inert gas purging process for creating the non-oxidizing atmosphere inside the reactor may not be performed. Specifically, the temperature range is preferred since the non-oxidizing atmosphere may be implemented by the vapor atmosphere at 50° C. or higher and a dissolution process distinct from a dechlorination reaction may be implemented stepwisely at 150° C. or lower, and the above maintenance time is more preferred since the anaerobic atmosphere creation may be activated when the time is 20 minutes or more and energy consumption and process operation time may be reduced when the time is 300 minutes or less.

Figure 1:
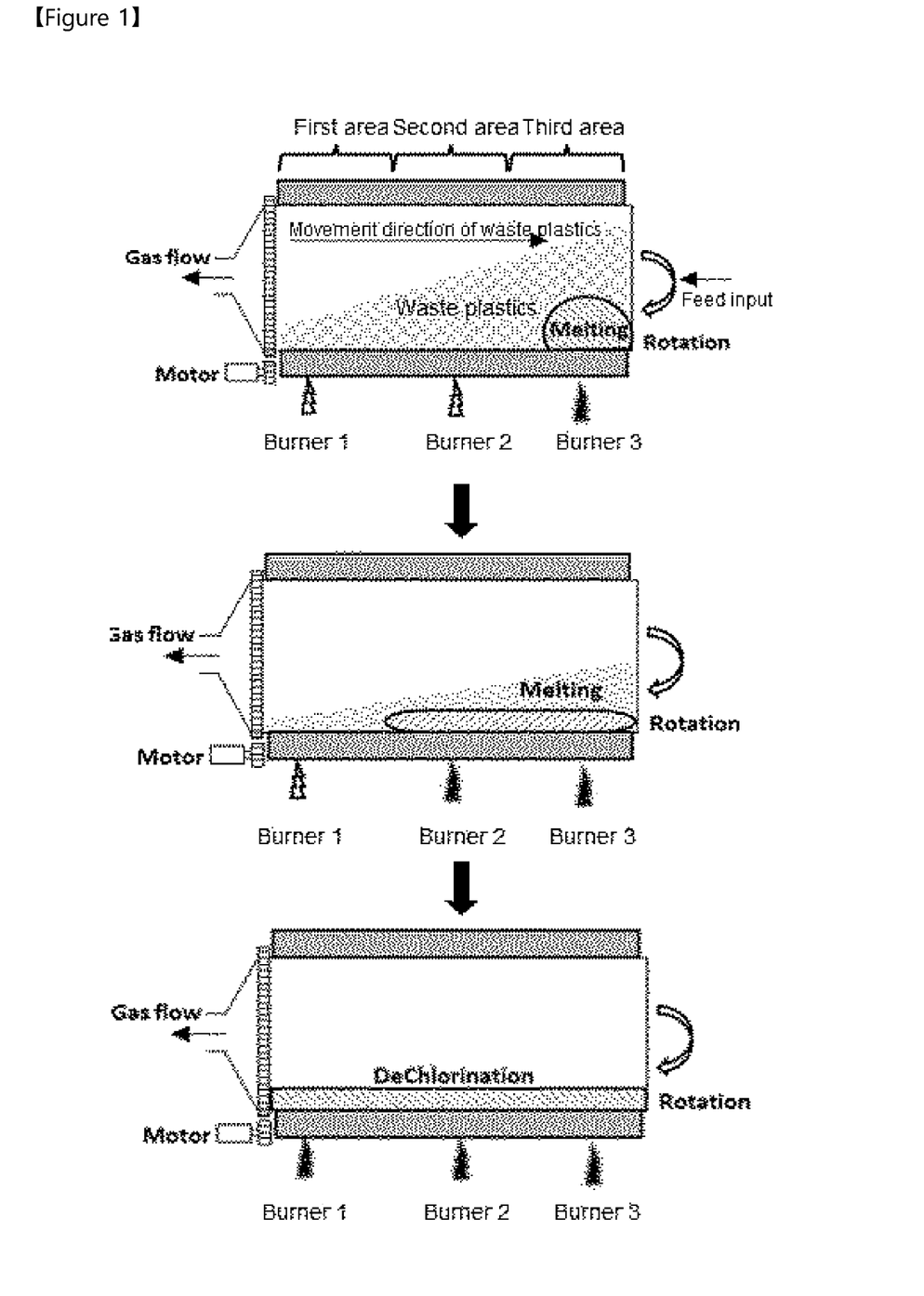
FIG. 1 is a schematic diagram showing a step-wise temperature rise control pyrolysis operation according to an embodiment of the present invention.

FIG. 1 is a schematic diagram showing a step-wise temperature rise control pyrolysis operation according to an embodiment of the present invention. Referring to FIG. 1, the batch reactor includes a third area in which a burner 3 is positioned sequentially in a direction from a raw material inlet to a reaction product outlet, a second area in which a burner 2 is positioned, and a first area in which a burner 1 is positioned. The process of step a) includes a process of heating at least a portion of the third area, at least a portion of the second area, and/or at least a portion of the first area to raise the temperature to 50 to 150° C. The process of step a) may be first heating at least a portion of the third area and then heating at least a portion of the second area, or may be heating both at least a portion of the third area and at least a portion of the second area.

Specifically, the process of step a) may include: a1) heating at least a portion of the third area to raise the temperature to 110 to 150° C.; a2) further heating at least a portion of the second area to raise the temperature to 110 to 150° C.; and a3) further heating at least a portion of the first area to raise the temperature to 110 to 150° C. Thus, a free space in a reaction product outlet side of the pyrolysis reactor may be provided to solve pressure rise and safety problems due to neck blockage. Simultaneously, since the waste plastics in the reactor may be dissolved evenly, the chlorine removal process of step b) and the pyrolysis process of step c) may be sequentially performed in a separate process later.

Meanwhile, the temperature of the process of step a) may refer to a temperature of a reactor internal reactant (molten plastic) or a temperature inside a gas separator (pyrolyzed gas), but the present invention is not limited to the measurement method. In addition, the third area, the second area, and the first area of the reactor may correspond sequentially to the third area, the second area, and the first area, when the reactor is divided into three areas having the same length in a direction from the raw material inlet to the reaction product outlet.

The chlorine removal process of step b) is for removing chlorine from the waste plastic melt before performing the pyrolysis reaction of waste plastics, and the melt which is the product of the waste plastic melting process of step a) is heated, thereby removing chlorine from the melt at the second temperature.

The process of step b) may be performed at 220 to 300° C. for 120 to 360 minutes under an anaerobic atmosphere. Specifically, the anaerobic atmosphere may be a non-oxidizing atmosphere without oxygen, and the process of step b) may be performed at 230 to 290° C., 240 to 280° C., or 240 to 260° C. for 140 to 340 minutes or 150 to 300 minutes. In the conventional pyrolysis operation of a batch reactor, temperature is raised all at once to 400 to 500° C. which is a pyrolysis temperature without a holding control in the temperature range, and uneven melting of waste plastics occurs by operating a plurality of burner at the same time, so that chlorine is dissociated in some sections and pyrolysis is performed in another section, which is not preferred in terms of impurity removal and energy efficiency. However, in the present invention, the evenly dissolved waste plastics are operated to be held for a certain period of time at the temperature range before the pyrolysis reaction is performed, thereby suppressing a resynthesis reaction of dissociated chlorine and a pyrolyzed olefin in the waste plastics when pyrolysis is performed later, and finally reducing a chlorine content in a pyrolysate. Specifically, the temperature range is preferred since a dechlorination reaction may be performed in PVC and the like at 220° C. or higher and recombination of dissociated chlorine and an olefin produced is minimized at 300° C. or lower, and the maintenance time is more preferred since a sufficient dechlorination reaction may be performed when time is 120 minutes or more and it is advantageous in terms of energy consumption and operation time minimization when the time is 360 minutes or less.

In step b), a chlorine content in a gas product emitted may be 1,000 to 3,500 ppm. Specifically, when a process of heating the waste plastic melt in step b) to remove chlorine from the melt at a second temperature is performed under the conditions of 250° C. for 120 minutes, the chlorine content in the gas product may be 1000 to 3500 ppm. More specifically, it may be 1300 to 3200 ppm or 1500 to 3000 ppm.

After step b), a chlorine content in the gas product emitted in the pyrolysis step at 300° C. or higher may be 200 ppm or less. However, the chlorine content of a gas product emitted in the pyrolysis step at 300° C. or higher during the conventional pyrolysis operation is 3000 to 6000 ppm, and the chlorine stays in the gas product for about 200 minutes or more to provide an environment in which organic Cl is likely to recombine. In the chlorine removal step b), 1,000 to 3,500 ppm of chlorine is removed from the waste plastic melt, so that the reaction may be performed in a state of reduced chlorine.

The pyrolysis process of step c) is for pyrolyzing the waste plastics into an oil which may be introduced to a refinery process, and is characterized in that the product from the chlorine removal process of step b) is heated, thereby pyrolyzing the waste plastic melt at the third temperature to prepare a pyrolysis oil including an olefin.

The pyrolysis process of step c) may be performed at 300 to 600° C. under an anaerobic atmosphere. Specifically, the anaerobic atmosphere may be a non-oxidizing atmosphere without oxygen, and the process of step c) may be performed at 300 to 550° C., 350 to 500° C., or 350 to 450° C. for 140 to 340 minutes or 150 to 300 minutes. In the present invention, under the conditions of the waste plastic melt having a significantly reduced chlorine as compared with the conventional technology, the pyrolysis process may be performed without a resynthesis reaction of olefin and chlorine included in the pyrolysate. Thus, a pyrolysis oil having a high olefin yield and a low chlorine content may be prepared without inputting an additive/neutralizer to a batch reactor or performing a separate pre/post treatment process. Specifically, the temperature range is preferred since pyrolysis may initiate at 300° C. or higher and a pyrolysis oil yield may be maximized at 600° C. or lower, and, the maintenance time is more preferred since sufficient pyrolysis may be performed when the maintenance time is 140 minutes or more and energy consumption and operation time may be minimized when the maintenance time is 340 minutes or less.

The pyrolysis process of step c) may further include a gas recovery process of recovering pyrolysis gas and a separation process of separating a pyrolyzed solid content into fine particles and assemblies.

In the gas recovery process, pyrolysis gas including low-boiling point hydrocarbon compounds such as methane ($CH_4$), ethane ($C_2H_6$), propane ($C_3H_8$), and the like is recovered from a gas phase produced in the pyrolysis process. The pyrolysis gas generally includes combustible materials such as hydrogen, carbon monoxide, and low-molecular weight hydrocarbon compounds. An example of the hydrocarbon compound includes methane, ethane, ethylene, propane, propene, butane, butene, and the like. Since the pyrolysis gas includes the combustible materials, it may be used as a fuel.

In the separation process, a solid content in a solid phase produced in the pyrolysis process, for example, a carbide is separated into fine particles and assemblies. Specifically, the solid content produced by the pyrolysis reaction may be separated into fine particles and assemblies by sorting using a sieve having a diameter smaller than an average particle diameter of waste plastics, centrifugation by a density difference, or the like. The fine particles and the assemblies may be retreated, if necessary and may be reused in the pyrolysis process, used as a fuel, or discarded, and the present invention is not limited thereto.

In the pyrolysis method of waste plastics according to an embodiment of the present invention, the pyrolysate of the process of step c) may include 50 to 800 ppm of total chlorine (Cl) and 10 to 550 ppm of organic chlorine with respect to the total weight. Specifically, 50 to 600 ppm or 50 to 500 ppm of total chlorine (Cl) and 50 to 450 ppm or 50 to 400 ppm of organic chlorine may be included. In the present invention, chlorine removal efficiency may be increased only by a temperature control without inputting an additive/neutralizer to a conventional rotary kiln.

Hereinafter, the preferred examples and the comparative examples of the present invention will be described. However, the following examples are only a preferred exemplary embodiment of the present invention, and the present invention is not limited thereto.

EXAMPLES

Example 1

4.5 tons of a household waste plastic feed was input to a rotary kiln pyrolysis reactor.

(Step 1) Burner 3 (see FIG. 1) was operated to raise the temperature from room temperature to 100° C. at a rate of 1.5° C./min, and maintain the temperature for 50 minutes to melt waste plastics and remove moisture.

(Step 2) Burner 3 and Burner 2 were further operated sequentially to raise the temperature to 150° C. at a rate of 1.5° C./min and then Burner 1 was finally operated to maintain the temperature for 200 minutes.

(Step 3) When all input waste plastics were evenly melted, the temperature was raised from 150° C. to 250° C. at a rate of 1° C./min and then maintained for 120 minutes. Thus, Cl was removed by releasing it from the waste plastics. Thereafter, the temperature was raised from 250° C. to 400° C. for 200 minutes to perform the pyrolysis of the waste plastic melt having a decreased Cl content.

Thereafter, pyrolysis gas was collected in a condenser and then a pyrolysis oil was obtained in a recovery unit.

Comparative Example 1

4.5 tons of a household waste plastic feed was input to a rotary kiln pyrolysis reactor.

Burner 3 and Burner 2 were operated at the same time, and then Burner 1 was further operated to raise the temperature from room temperature to 350° C. at a rate of 1° C./min and then maintain the temperature for 300 minutes. Thereafter, pyrolysis gas was collected in a condenser and then a pyrolysis oil was obtained in a recovery unit.

Evaluation Example

[Evaluation Example 1]: Analysis of Temperature Profile Inside Rotary Kiln

The pyrolysis reaction products of Example 1 and Comparative Example 1 were monitored in real time. The temperature of the reaction product was measured to analyze the temperature profile inside the rotary kiln, and the results are shown in FIG. 3.

Figure 3:
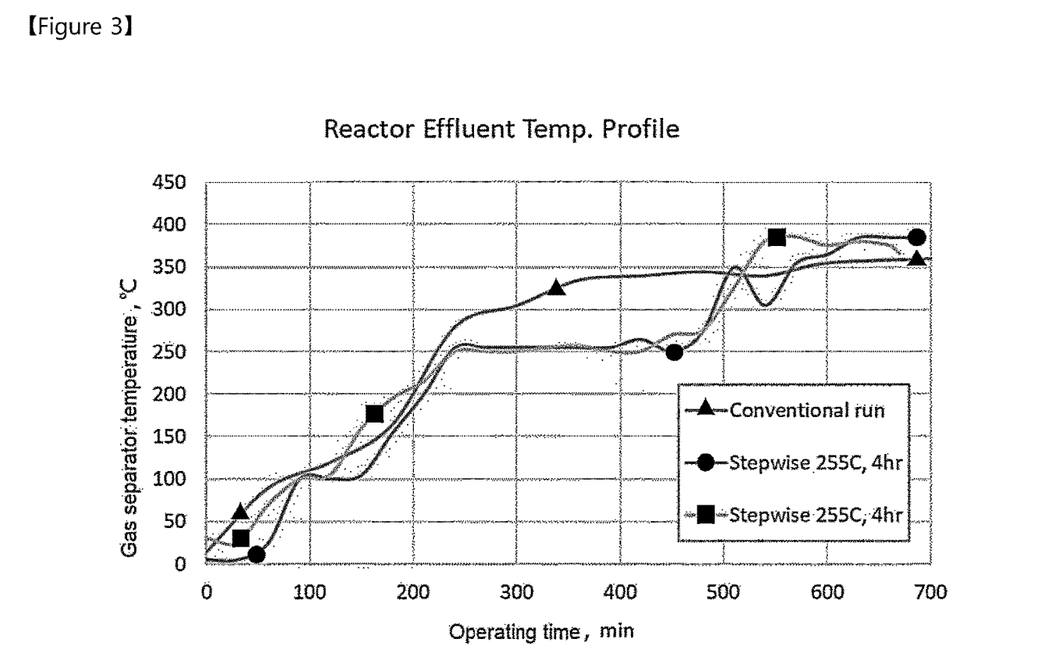
FIG. 3 is a profile graph of a rotary kiln internal temperature depending on the pyrolysis operations of Example 1 and Comparative Example 1.

Referring to FIG. 3, it was confirmed that the operation of the rotary kiln of Comparative Example 1 (conventional run of FIG. 3) was performed by raising the temperature to 350° C. which is a pyrolysis temperature without a holding control at 250 to 300° C. However, in Example 1 (stepwise 255° C., 4 hours in FIG. 3), a holding control operation was able to be performed in the section of 100° C., 250 to 300° C. by the operation conditions of the present invention. Thus, it is analyzed that water was removed from the waste plastics at the section of 100° C., Cl was removed from the molten waste plastics in the section of 250 to 300° C., and the pyrolysis of waste plastics was performed under the conditions of a relatively reduced Cl content in the section of 300° C. A reenactment test was performed under the same conditions with the temperature control at 255° C. for 4 hours, and it was confirmed that a control to desired operation conditions was possible.

[Evaluation Example 2]: Analysis of Cl Content in Reaction Product (Evaluation Method)

Figure 4:
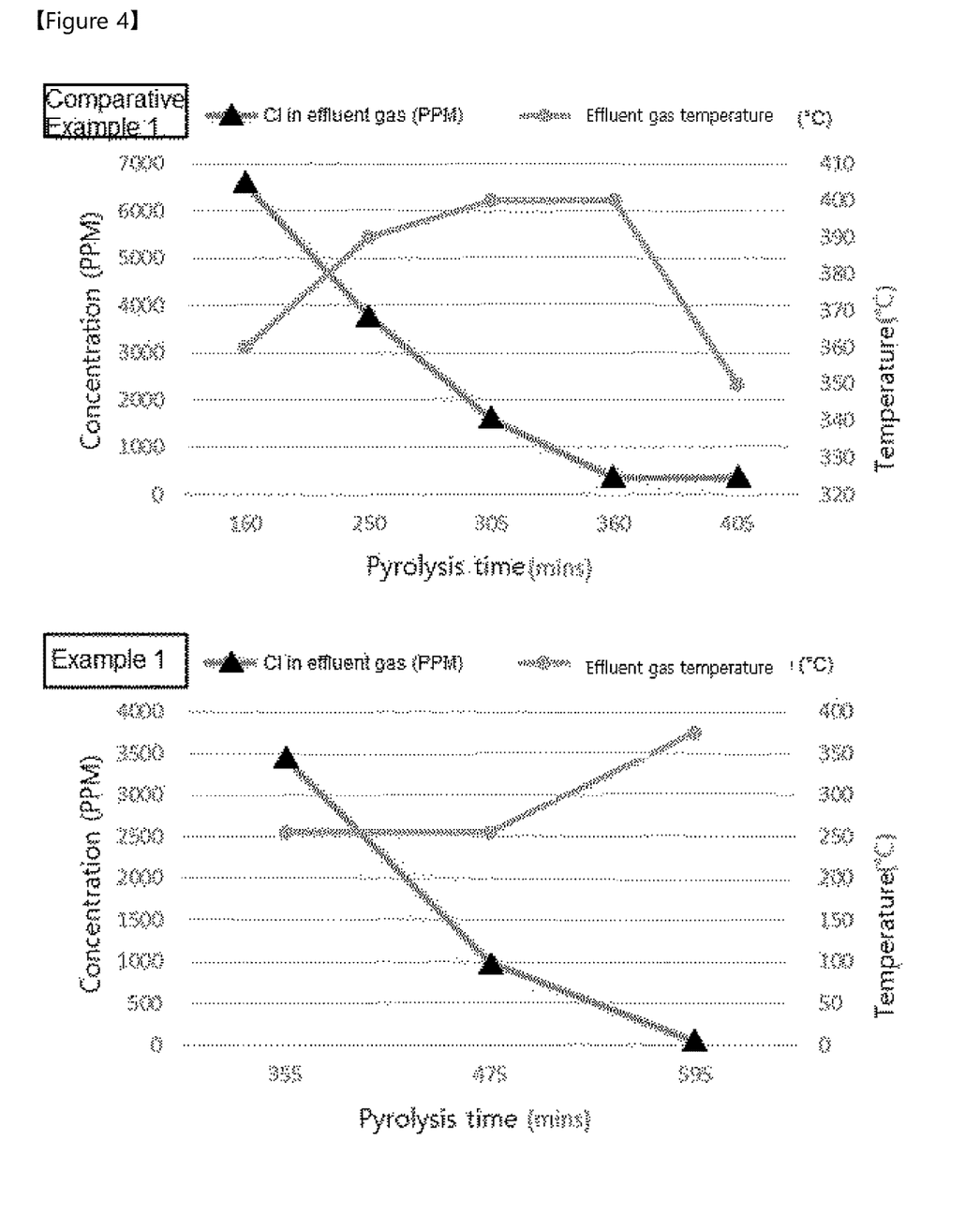
FIG. 4 is a graph showing a chlorine reduction trend in the reaction product of Example 1 and Comparative Example 1.
Figure 5:
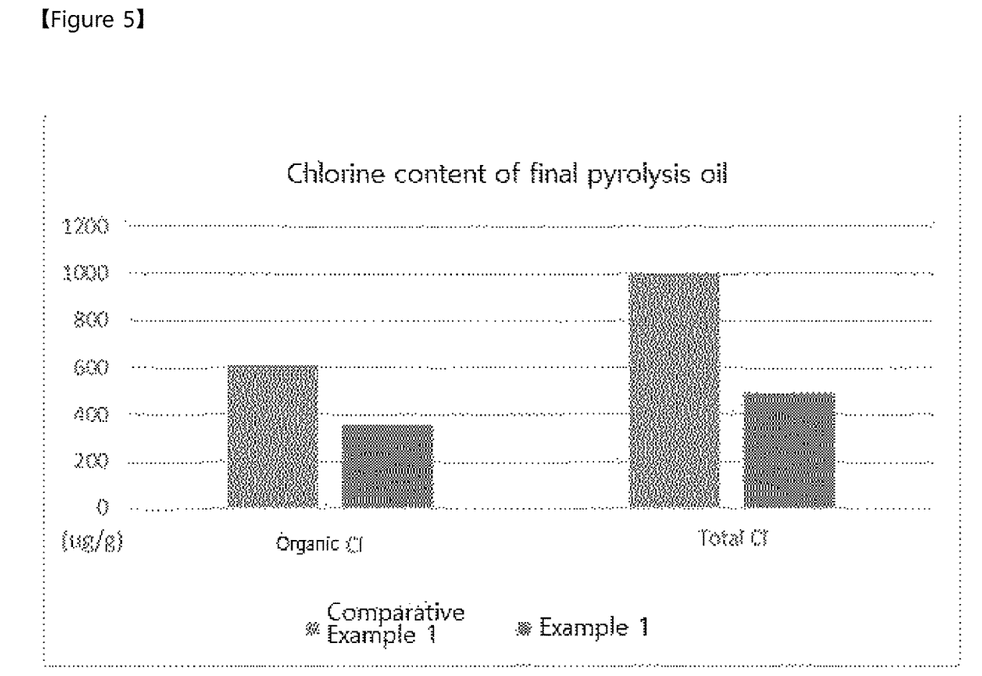
FIG. 5 is a graph of comparison of the chlorine contents of final products (pyrolysis oil) of Example 1 and Comparative Example 1.

The pyrolysis reaction product of Example 1 and Comparative Example 1 were monitored in real time to measure chlorine contents, and the results are shown in FIGS. 4 and 5.

1. Analysis of Real-Time Chlorine Reduction Trend in Oil and Effluent

In the conventional pyrolysis method, 300 to 6500 ppm of Cl was present in effluent gas in the pyrolysis step at 350° C. or higher, and an environment of resynthesis with an olefin produced by pyrolysis was provided.

In the pyrolysis method of waste plastics of the present invention, 1000 to 3500 ppm of Cl was removed in the holding step at 250° C., and only about 30 ppm of Cl was present in the pyrolysis step at 350° C. or higher.

2. Cl Content in Final Pyrolysis Oil

Total Cl in the final pyrolysis oil was confirmed to be reduced from 1000 ppm (conventional) to 489 ppm (255° C., 4 hours). Organic Cl was confirmed to be reduced from 610 ppm to 356 ppm.

Although the exemplary embodiments of the present invention have been described above, the present invention is not limited to the exemplary embodiments but may be made in various forms different from each other, and those skilled in the art will understand that the present invention may be implemented in other specific forms without departing from the spirit or essential feature of the present invention. Therefore, it should be understood that the exemplary embodiments described above are not restrictive, but illustrative in all aspects.

The invention claimed is:

1. A pyrolysis method of waste plastics, the method comprising:
   a) inputting waste plastics to a batch reactor and performing heating to produce a waste plastic melt at a first temperature of 50 to 150° C. for 20 to 300 minutes under an anaerobic atmosphere;
   b) heating the waste plastic melt to remove chlorine from the melt at a second temperature of 220 to 300° C. for 120 to 360 minutes under an anaerobic atmosphere; and
   c) heating the waste plastic melt from which chlorine has been removed to produce a pyrolysate at a third temperature of 300 to 600° C. under an anaerobic atmosphere,
   wherein the batch reactor is sequentially heated in a direction from a raw material inlet to a reaction product outlet so that the temperature is raised from the first temperature to the third temperature.

2. The pyrolysis method of waste plastics of claim 1, wherein the waste plastics comprise at least one plastic selected from the group consisting of polyethylene (PE), polypropylene (PP), polyethylene terephthalate (PET), polyvinyl chloride (PVC), and polystyrene (PS).

3. The pyrolysis method of waste plastics of claim 1, wherein the waste plastics comprise 7000 ppm or more of chlorine with respect to a total weight.

4. The pyrolysis method of waste plastics of claim 1, wherein the batch reactor comprises a third area, a second area, and a first area sequentially in a direction from a raw material inlet to a reaction product outlet, and
   the process of step a) comprises a process of heating at least a portion of the third area, at least a portion of the second area, and/or at least a portion of the first area to raise the temperature to 50 to 150° C.

5. The pyrolysis method of waste plastics of claim 1, wherein the batch reactor comprises a third area, a second area, and a first area sequentially in a direction from a raw material inlet to a reaction product outlet, and
   the process of step a) comprises:
   a1) heating at least a portion of the third area to raise the temperature to 110 to 150° C.;
   a2) further heating at least a portion of the second area to raise the temperature to 110 to 150° C., a
   a3) further heating at least a portion of the first area to raise the temperature to 110 to 1500° C.

6. The pyrolysis method of waste plastics of claim 1, wherein in process of step b), a chlorine content in a gas product emitted is 1000 to 3500 ppm.

7. The pyrolysis method of waste plastics of claim 1, wherein the pyrolysate of the process of step c) comprises 50 to 800 ppm of total chlorine (Cl) and 10 to 550 ppm of organic chlorine with respect to the total weight.

8. A pyrolysis method of waste plastics, the method comprising:
   a) heating waste plastics as a recycled feed in a batch reactor to produce a waste plastic melt at a first temperature of 50 to 150° C. for 20 to 300 minutes under an anaerobic atmosphere;
   b) heating the waste plastic melt to remove chlorine from the melt at a second temperature of 220 to 300° C. for 120 to 360 minutes under an anaerobic atmosphere; and
   c) heating the waste plastic melt from which chlorine has been removed to produce a pyrolysate at a third temperature of 300 to 600° C. under an anaerobic atmosphere,
   wherein the batch reactor is sequentially heated in a direction from a raw material inlet to a reaction product outlet so that the temperature is raised from the first temperature to the third temperature.

* * * * *